(12) United States Patent
Koricanek

(10) Patent No.: US 11,767,918 B2
(45) Date of Patent: Sep. 26, 2023

(54) SAND LOCK VALVE

(71) Applicant: Nitro Fluids, LLC., Nordheim, TX (US)

(72) Inventor: Bobby Lee Koricanek, Yorktown, TX (US)

(*) Notice: Subject to any disclaimer, the term of this patent is extended or adjusted under 35 U.S.C. 154(b) by 0 days.

(21) Appl. No.: 17/807,381

(22) Filed: Jun. 17, 2022

(65) Prior Publication Data

US 2022/0412467 A1 Dec. 29, 2022

Related U.S. Application Data

(60) Provisional application No. 63/214,674, filed on Jun. 24, 2021.

(51) Int. Cl.
F16K 3/02 (2006.01)
F16K 3/20 (2006.01)

(52) U.S. Cl.
CPC ............ *F16K 3/0227* (2013.01); *F16K 3/207* (2013.01)

(58) Field of Classification Search
CPC ....... F16K 3/0227; F16K 3/0236; F16K 3/207
USPC ......................................................... 251/328
See application file for complete search history.

(56) References Cited

U.S. PATENT DOCUMENTS

| | | | | |
|---|---|---|---|---|
| 3,044,741 A * | 7/1962 | Grove | ...................... | F16K 3/207 251/328 |
| 3,095,004 A * | 6/1963 | Jackson, Jr. | ............... | F16K 3/36 137/246.11 |
| 3,135,285 A * | 6/1964 | Volpin | ...................... | F16K 3/36 251/327 |
| 3,367,625 A * | 2/1968 | Fortune | ................... | F16K 3/207 251/327 |
| 3,497,177 A * | 2/1970 | Hulsey | ................... | F16K 3/0227 251/363 |
| 6,966,537 B2 * | 11/2005 | Sundararajan | ........ | F16K 3/0227 251/175 |
| 8,490,945 B2 * | 7/2013 | Keeper | ................... | F16K 5/188 251/315.1 |
| 8,979,068 B2 * | 3/2015 | Yeary | .................... | F16K 5/0678 251/192 |
| 9,885,420 B2 * | 2/2018 | Sundararajan | ........ | F16K 3/0236 |
| 10,012,316 B2 * | 7/2018 | Taguchi | ................ | F16K 3/0218 |
| 10,072,763 B2 * | 9/2018 | Chen | ..................... | F16K 3/0236 |
| 10,718,436 B2 * | 7/2020 | Powell | ................... | F16K 27/044 |
| 11,047,485 B2 * | 6/2021 | Al-Jarallah | ........... | F16K 3/0254 |
| 11,079,024 B1 | 8/2021 | Cotton | | |

(Continued)

FOREIGN PATENT DOCUMENTS

WO 98/25057 A2 6/1998

*Primary Examiner* — Craig J Price
(74) *Attorney, Agent, or Firm* — Cabello Hall Zinda, PLLC

(57) ABSTRACT

A singular piston included behind a valve seat within a gate valve assembly can be energized by external pressure through a hydraulic port within the valve body. When the back side of the singular piston is energized, the singular piston applies force in one direction against the adjacent valve seat, valve gate, opposing valve seat and valve seat pocket in both the valve open position and the valve closed position to block any unwanted matter from moving into the valve backside cavity. A singular piston has a pressure sealing surface and a piston pocket with an adjacent pressure sealing surface that allows the valve to seal in the closed position with the contained fluid bore pressure against the opposing valve body flow path side to the piston without the piston being energized.

20 Claims, 7 Drawing Sheets

(56) References Cited

U.S. PATENT DOCUMENTS

| | | |
|---|---|---|
| 2010/0090146 A1 | 4/2010 | Keeper et al. |
| 2014/0318807 A1* | 10/2014 | Atencio ................. F16K 3/207 166/374 |
| 2020/0240537 A1 | 7/2020 | Moseley |
| 2021/0033199 A1 | 2/2021 | Atencio |

* cited by examiner

SAND LOCK VALVE

CROSS-REFERENCE

This application claims priority to U.S. Provisional Application Ser. No. 63/214,674, filed Jun. 24, 2021, the contents of which are incorporated herein in their entirety by reference.

FIELD OF THE INVENTION

This disclosure relates generally to oil and gas equipment, and more particularly to an apparatus and method to prevent unwanted matter from entering the valve backside cavity of a gate valve typically used for fracking a wellbore using a pressure actuated sealing mechanism incorporated within a gate valve. The described disclosure can be used for all gate valves that are rigged up on surface of the frack location so as to deliver the medium into the wellbore so as to frack the formation in a safer and more efficient manner.

BACKGROUND OF THE INVENTION

Conventional gate valves that are rigged up on surface to deliver the medium and pressure required to frack the wellbore. When pumping the medium under pressure through the conventional gate valves, the medium which is typically a fine mesh sand, builds up on the back side cavity of the gate valve. This causes the gate valve to be packed off with sand and can cause the valve to become stuck in the open or closed position. The fine mesh sand can also cause abrasive damage to the internal components of the valve which leads to the valve to leak under pressure in the closed and open position. Another issue that can occur, the packing that seals the internal pressure of the valve can fail which causes the valve to leak out to the location. These situations are extremely dangerous to the workers, will pollute the environment and cost the operator a lot of downtime and added expense.

For example, FIG. 6 shows a conventional gate valve assembly in an open position. The conventional gate valve assembly is formed from a valve body 31, which has an upstream passage 30 and a downstream passage 29. Both the upstream passage 30 and the downstream passage 29 are concentrically located to each other and allow the medium (i.e., fluid sand mix) to pass through the valve body 31 in the open position. Fluid sand mix can enter from the upstream passage 30 and exit the downstream passage 29. Alternatively, the fluid sand mix can enter from the downstream passage 29 and exit the upstream passage 30 in the open position.

Upstream seat pocket 37 is formed into the valve body 31 and located concentrically to the upstream passage 30 at the upstream passage 30 side of the valve body 31. Upstream seat 27 is located concentrically to the upstream seat pocket 37 and is disposed partially within the upstream seat pocket 37. Downstream seat pocket 38 is formed into the valve body 31 and located concentrically to the downstream passage 29 at the downstream passage 29 side of the valve body 31. Downstream seat 33 is located concentrically to the downstream seat pocket 38 and is disposed partially within the downstream seat pocket 38. The gate 25 is in the open position and is located between upstream seat 27 and downstream seat 33.

The fluid sand mix in the conventional valve assembly of FIG. 6 can enter the upper backside void 26 and the lower backside void 32 and can damage the upper valve stem packing 24 and lower valve stem packing 34. Once both upper valve stem packing 24 and lower valve stem packing 34 are damaged, the conventional gate valve will leak to the outside of valve body 31.

Moreover, the fluid sand mix enters the upper backside void 26 and the lower backside void 32 under very high pressure and velocity, which in turn causes the sealing faces and components to erode due to a "sandblasting" effect.

Another common failure of a conventional gate valve is when the fluid sand mix enters the upper backside void 26 and the lower backside void 32 under very high pressure and velocity and "packs off" within the upper backside void 26 and the lower backside void 32, which stops the gate 25 from moving between the open position as shown in FIG. 6 and the closed position and FIG. 7.

FIG. 7 shows the conventional gate valve in the closed position. When the fluid sand mix enters the valve body 31 through the upstream passage 30, the gate 25 is pushed up against the downstream seat 33 and downstream seat pocket 38. A seal is formed between gate 25, downstream seat 33, and downstream seat pocket 38. The fluid sand mix now cannot communicate with the downstream passage 29. However, a gap is created between upstream seat pocket 37, upstream seat 27, and upstream passage side of gate 25. The fluid sand mix can now enter the upper backside void 26 and the lower backside void 32, which will cause the conventional gate valve to fail as it would in the open position.

When the fluid sand mix enters the valve body 31 through the downstream passage 29, the gate 25 is pushed up against the upstream seat 27 and upstream seat pocket 37. A seal is formed between gate 25, upstream seat 27 and upstream seat pocket 37. The fluid sand mix now cannot communicate with the upstream passage 30. However, a gap is created between downstream seat pocket 38, downstream seat 33, and downstream passage 29 side of gate 25. The fluid sand mix can now enter the upper backside void 26 and the lower backside void 32, which will cause the conventional gate valve to fail as it would in the open position.

The conventional valve now cannot seal in the closed position shown in FIG. 7, and the fracking operation is halted. The conventional valve now has to be replaced on the fracking location, which is extremely dangerous to personal life and the environment and is extremely costly.

One method currently used to mitigate the fine mesh sand from getting into the back side cavity of the gate valve is to pump grease into the back side cavity under pressure. Unfortunately, this method does not mitigate the problem completely and the medium still finds its way into the back side cavity of the gate valve and causes the valve to fail. Also pumping the specialized grease into the back side of the valve is costly due to the continuous pumping of grease and amount of grease required to fill the back side cavity.

BRIEF DESCRIPTION OF THE DRAWINGS

For a more detailed description of the embodiments of the present disclosure, reference will now be made to the accompanying drawings, wherein.

DETAILED DESCRIPTION

Figure 1:
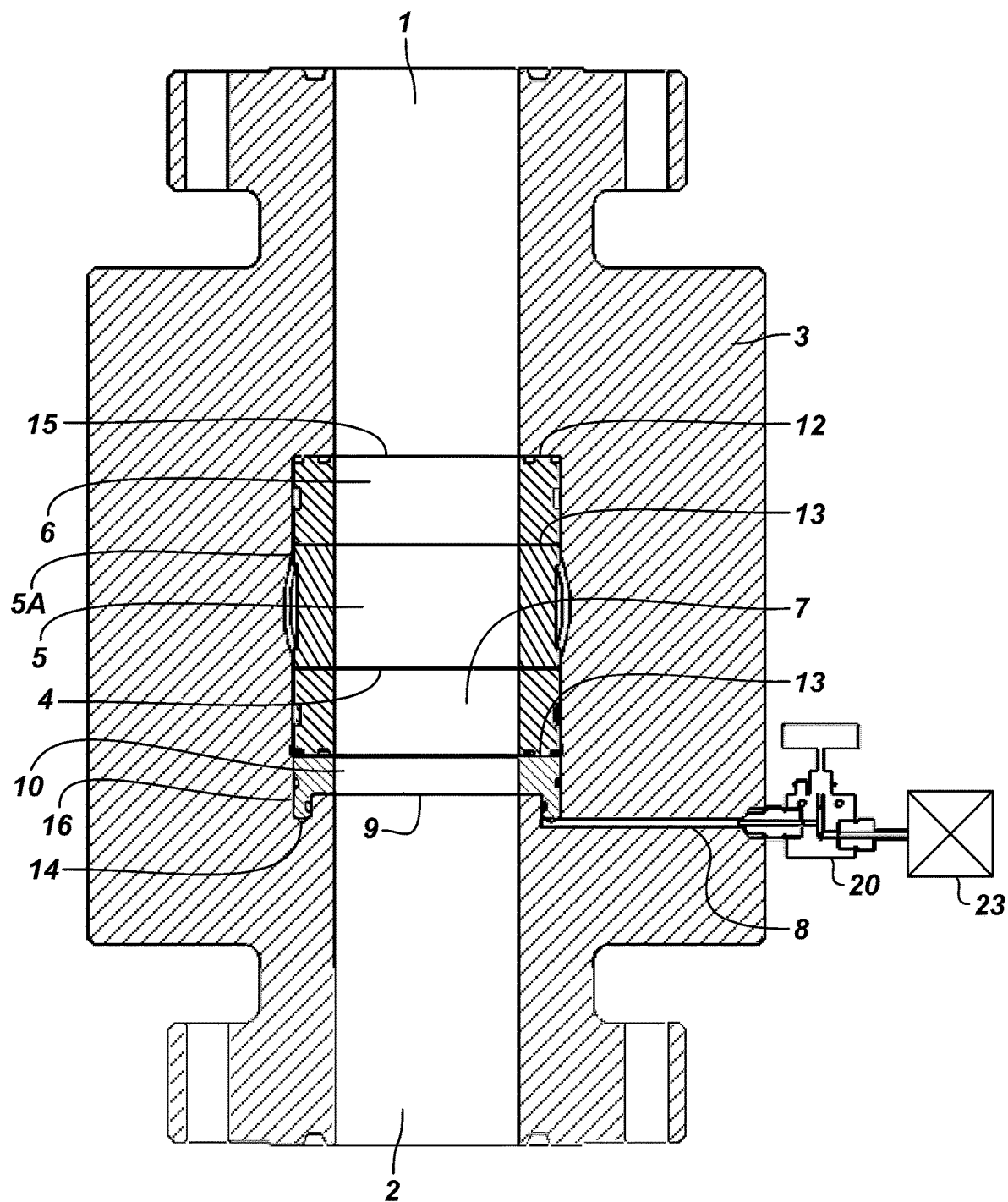
FIG. 1 is a cross-sectional view of a gate valve assembly in the open position according to the present disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Referring initially to FIG. 1, a gate valve assembly is formed from a valve body 3 which has an upstream passage 2 and a downstream passage 1. Both the upstream passage 2 and the downstream passage 1 are concentrically located to each other and allow the medium (i.e., fluid sand mix) to pass through the valve body 3 in the open position. Fluid sand mix can enter from the upstream passage 2 and exit the downstream passage 1. Alternatively, the fluid sand mix can enter from the downstream passage 1 and exit the upstream passage 2 in the open position.

Piston pocket 16 is formed into the valve body 3 and located concentrically to the upstream passage 2 at the upstream passage 2 side of the valve body 3. As shown in a close-up view in FIG. 2, a piston 10 is located concentrically to the piston pocket 16 and is disposed partially within the piston pocket 16. The piston 10 includes a crown 10A and a skirt 10B. The skirt 10B has an outside groove 21A to cooperate with an outside diameter (OD) seal or O-ring 21 and an inside groove 22A to cooperate with an inside diameter (ID) seal or O-ring 22. Preferably the piston 10 is formed as a single piece.

A piston pocket hydraulic recess 14 is located at the base of the piston pocket 16 and opposite the bottom surface 10C of the skirt 10B and has a hydraulic port 8 that intersects the piston pocket hydraulic recess 14. The hydraulic port 8 has an opening located on the exterior face of the valve body 3. Needle valve 20 is fixedly attached to the opening of the hydraulic port 8.

When the gate valve assembly is in the open or closed position, hydraulic pressure is pumped through needle valve 20 via an external hydraulic pressure source 23. The hydraulic pressure travels through the hydraulic port 8 and fills the piston pocket hydraulic recess 14, and in turn the hydraulic pressure moves the piston 10 outwardly from the piston pocket 16 towards the downstream passage 1 of the valve body 3. The piston 10 has the OD O-ring 21 and the ID O-ring 22, which stop the hydraulic pressure from communicating with the downstream passage 1, the upstream passage 2, and the backside valve cavity 19. The backside valve cavity 19 is formed in a channel 5A that contains gate 5, such as are shown in FIG. 3.

Figure 4:
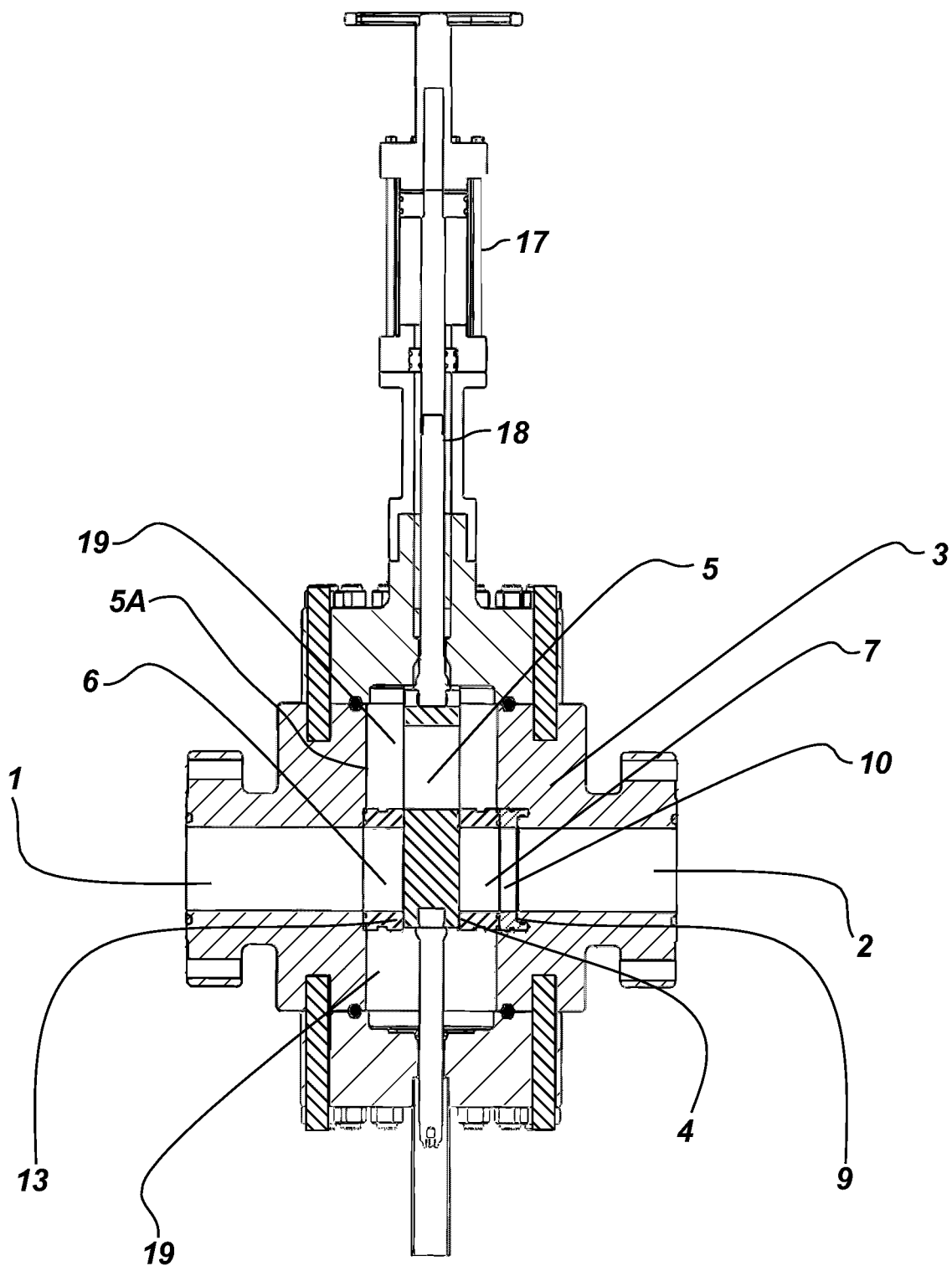
FIG. 4 is a cross-sectional view of a gate valve assembly in the closed position according to the present disclosure including the hydraulic assembly and upper and lower bonnets.

Referring to FIG. 4, the valve assembly is shown in the closed position. When the well pressure enters the downstream passage 1 of the valve body 3, the downstream 1 side of the gate 5 will move towards the upstream passage 2 and will move an upstream seat 7 towards the upstream passage 2, which will in turn move the piston 10 back into the piston pocket 16. Additionally, the hydraulic pressure is pushed from the piston pocket hydraulic recess 14, through the hydraulic port 8, and through the needle valve 20 and is in turn returned to the hydraulic pressure source 23.

Figure 2:
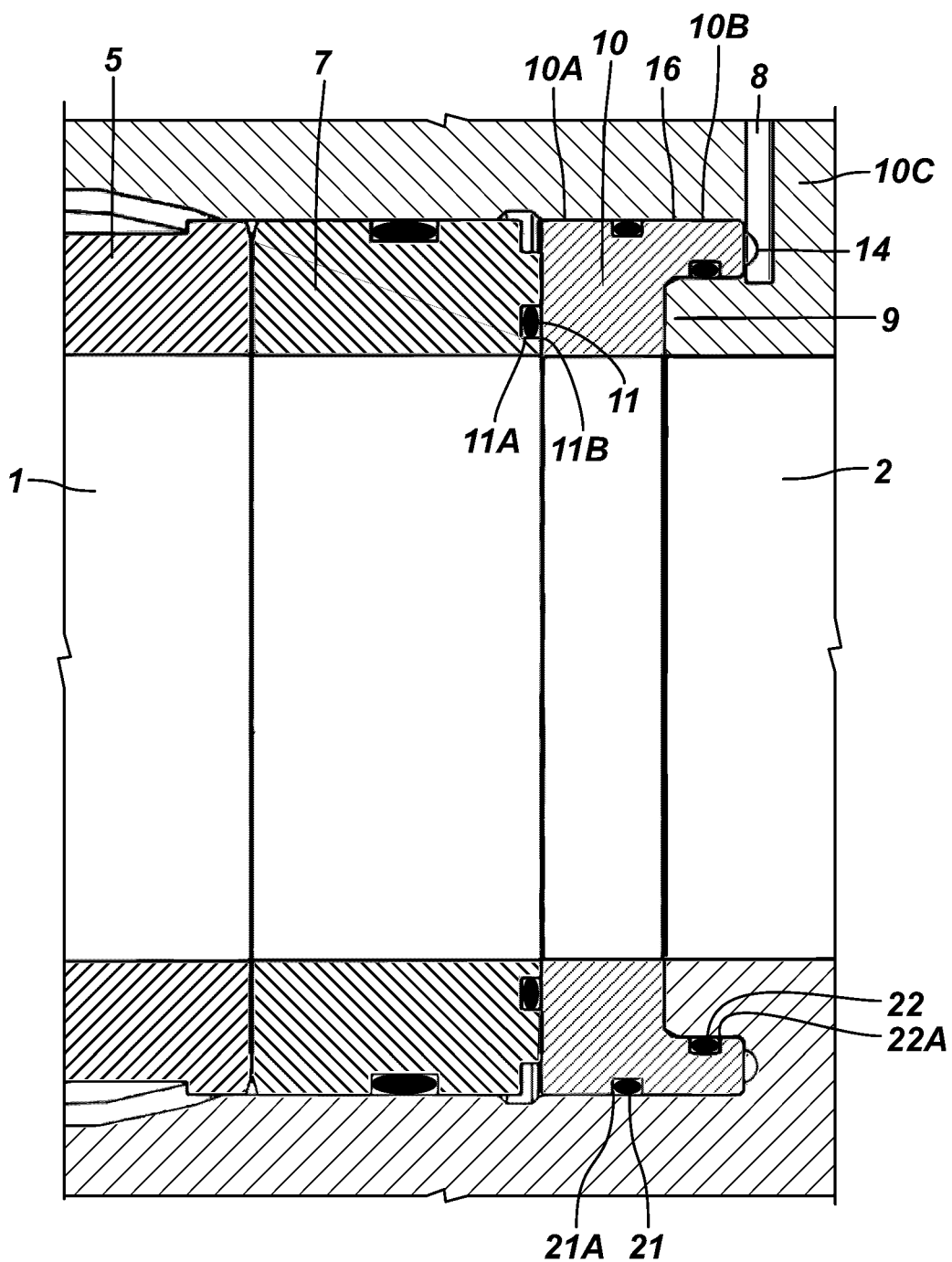
FIG. 2 is a partial view of the inner assembly of FIG. 1.

When the gate valve assembly is in the open position, the fluid sand mix enters the valve body 3 from the upstream passage 2 through the valve body 3 and exits through the downstream passage 1. Alternatively, in the open position, the fluid sand mix can enter the valve body 3 from the downstream passage 1 through the valve body 3 and can exit through the upstream passage 2. When the valve assembly is in the open position as shown in FIGS. 1, 2 and 3, pressure is applied via the hydraulic pressure source 23, the piston 10 is forced towards the downstream passage 1. The piston 10 is then forced onto the upstream passage 2 side of the upstream seat 7. The upstream seat 7 is forced onto the upstream side of the gate 5. The downstream side of the gate 5 is forced onto the upstream side of a downstream seat 6. The downstream seat 6 is then forced onto a downstream seat pocket 15. A piston seat sealing surface 11, the upstream side of the gate 5, the gate seat sealing surface 4, the downstream gate seat sealing surface 13, and a downstream seat pocket seat sealing surface 12 are now sealed. Fluid sand mix cannot pass into the backside valve cavity 19. (During the operation of conventional gate valves in the open position as noted herein, the fluid sand mix will enter the backside of the valve cavity, which can cause catastrophic damage to the valve.)

Figure 3:
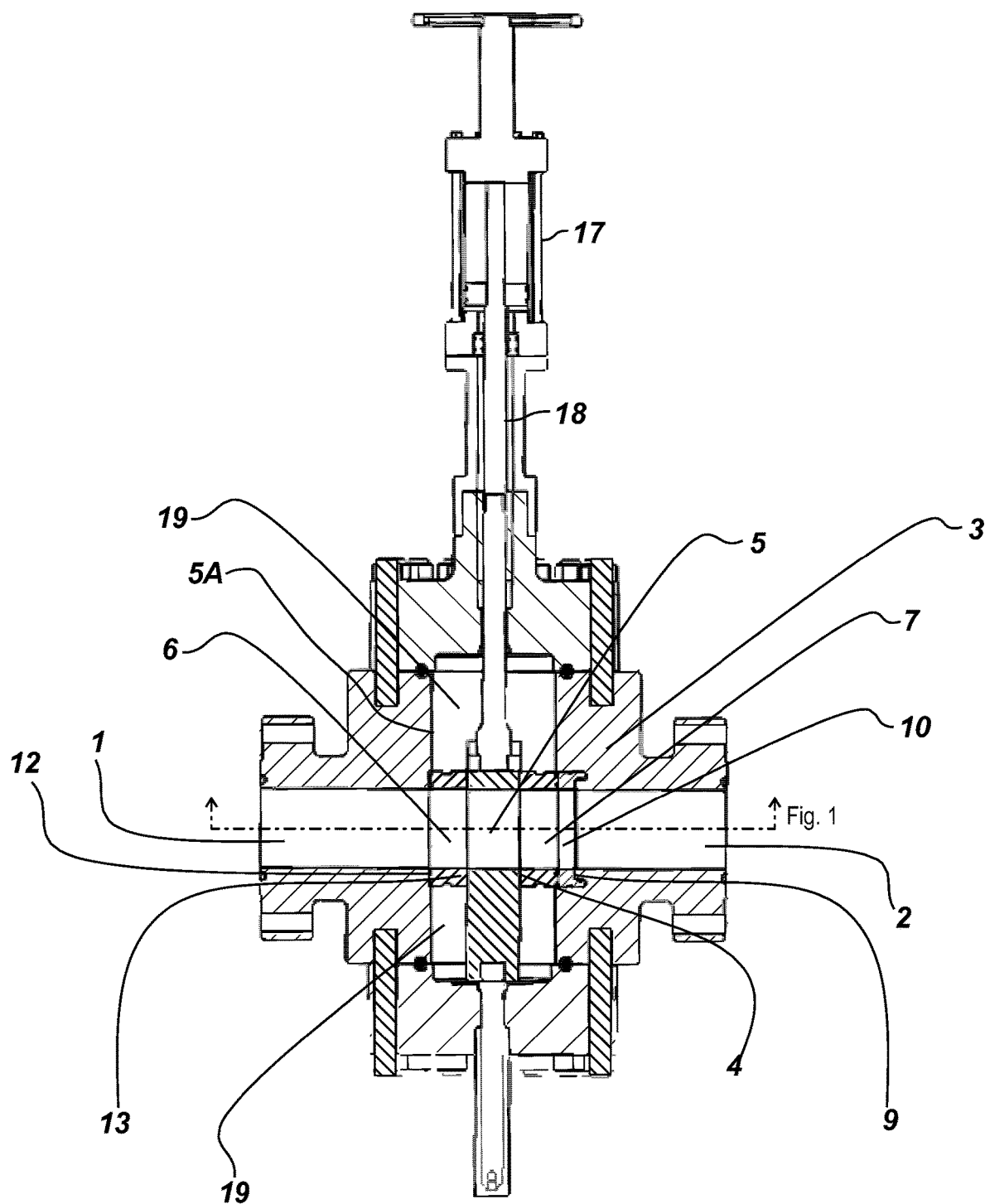
FIG. 3 is a cross-sectional view of a gate valve assembly in the open position according to the present disclosure including a hydraulic assembly and upper and lower bonnets.

Once it is time to change the position of the valve assembly from the open position as shown in FIG. 3 to the closed position shown in FIG. 4, the hydraulic pressure is released from the hydraulic pressure source 23. Piston 10, upstream seat 7, gate 5, and downstream seat 6 will now have no pressure forcing them to be compressed together, so in turn piston seat sealing surface 11, upstream gate seat sealing surface 4, downstream gate seat sealing surface 13, and downstream seat pocket seat sealing surface 12 will now unseal.

The hydraulic ram assembly 17 can now be functioned to the closed position. The hydraulic ram assembly 17 will move the valve stem 18 and gate 5 into the closed position. It will be understood that the gate 5 can also be moved manually as those familiar with the art will understand.

Figure 5:
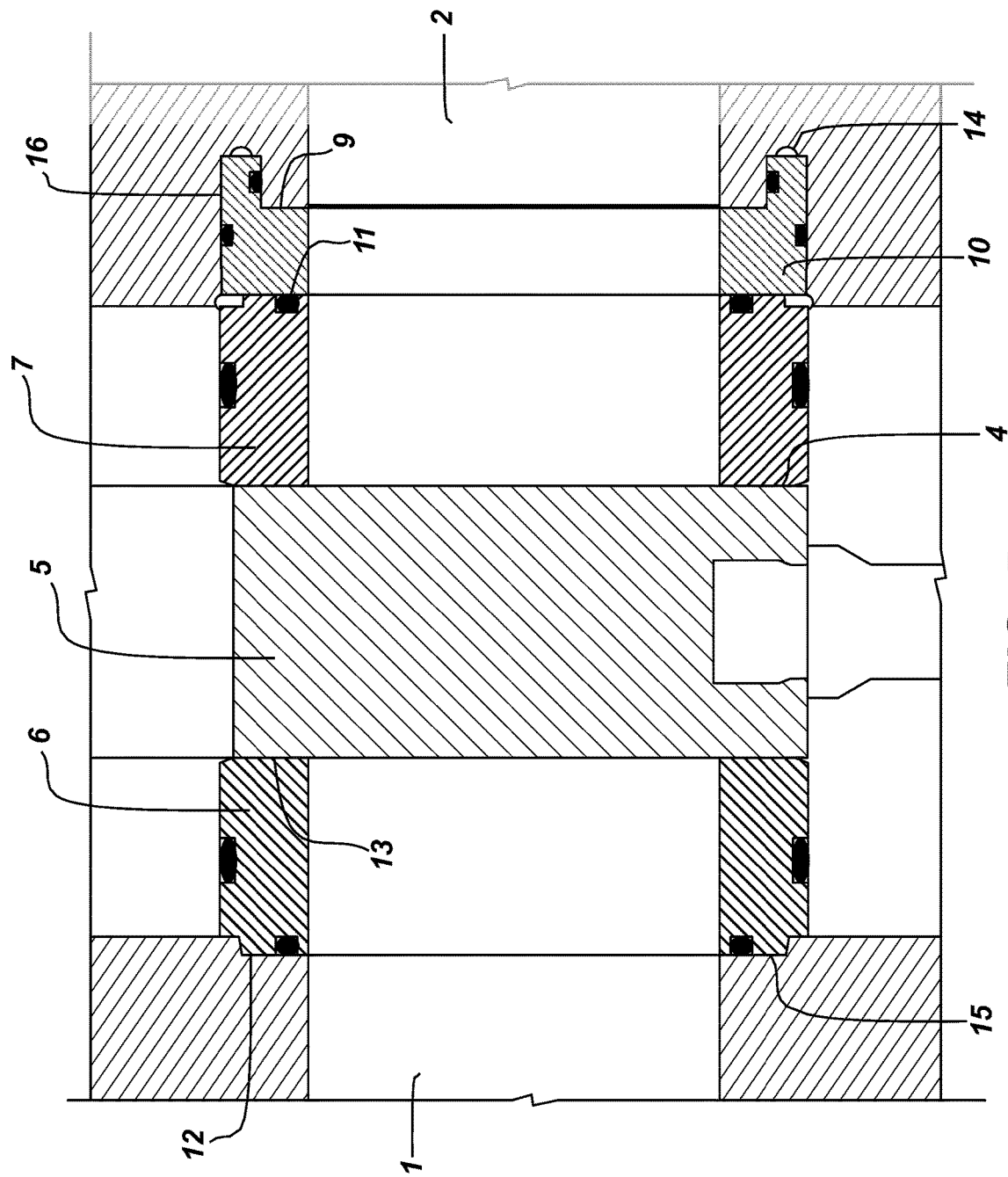
FIG. 5 is a partial view of the inner assembly of FIG. 4.

When the gate 5 is moved into its closed position as shown in FIGS. 4 and 5, the hydraulic pressure source 23 can now be energized. When the gate valve assembly is in the closed position, pressure is applied via the hydraulic pressure source 23, the piston 10 is forced towards the downstream passage 1. The piston 10 is then forced onto the upstream passage 2 side of the upstream seat 7. The upstream seat 7 is forced onto the upstream side of the gate 5. The downstream side of the gate 5 is forced onto the upstream side of the downstream side of the downstream seat 6. The downstream seat 6 is then forced onto the downstream seat pocket 15. The piston seat sealing surface 11, upstream gate seat sealing surface 4, downstream gate seat sealing surface 13, and downstream seat pocket seat sealing surface 12 are now sealed. Fluid sand mix cannot pass into the backside valve cavity 19. (During the operation of conventional gate valves in the closed position as noted herein, the fluid sand mix will enter the backside of the valve cavity, which can cause catastrophic damage to the valve.)

When moving the valve assembly from the open to closed position and closed to open position, the hydraulic pressure from the hydraulic pressure source 23 will be released.

In contrast to the disclosed gate valve assembly and as noted previously with reference to FIG. 6 showing a conventional valve assembly in the open position, fluid sand mix can enter from the upstream passage 30 and exit the downstream passage 29 in the conventional valve assembly. Alternatively, the fluid sand mix can enter from the downstream passage 29 and exit the upstream passage 30 in the open position.

Figure 6:
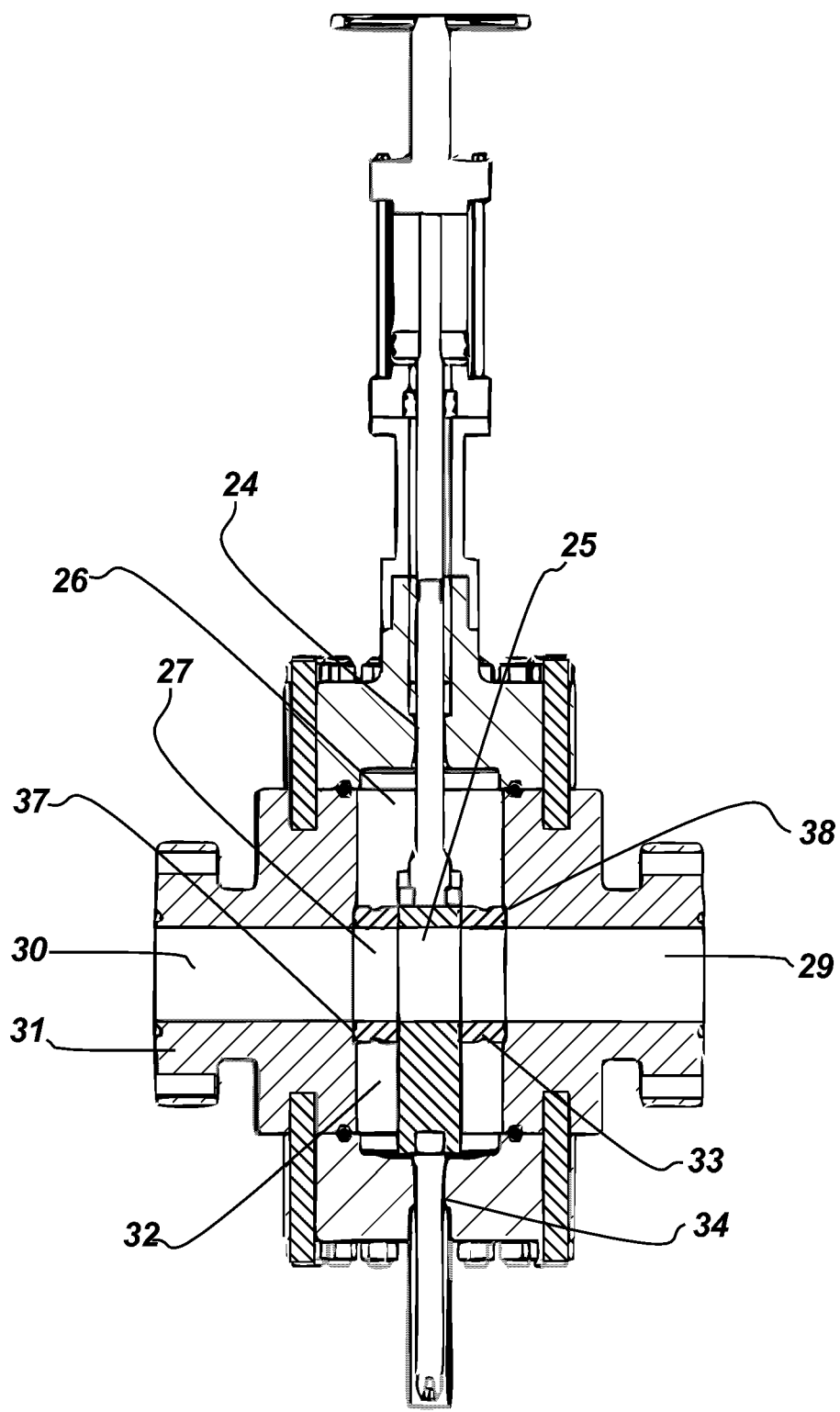
FIG. 6 is a cross-sectional view of a conventional gate valve in the open position.

In particular and unlike the currently disclosed embodiment shown in FIG. 1, the fluid sand mix in the conventional valve assembly of FIG. 6 can enter the upper backside void 26 and the lower backside void 32 because there is no sealing and because there is a gap between upstream seat pocket 37, upstream seat 27, gate 25, downstream seat 33, and downstream seat pocket 38. The fluid sand mix can now enter the upper backside void 26 and the lower backside void 32 in the conventional valve assembly of FIG. 6 and can damage the upper valve stem packing 24 and lower valve stem packing 34. Once both upper valve stem packing 24 and lower valve stem packing 34 are damaged, the conventional gate valve will leak to the outside of valve body 31.

As also noted, the fluid sand mix enters the upper backside void 26 and the lower backside void 32 under very high pressure and velocity, which in turn causes the sealing faces and components to erode due to a "sandblasting" effect.

Figure 7:
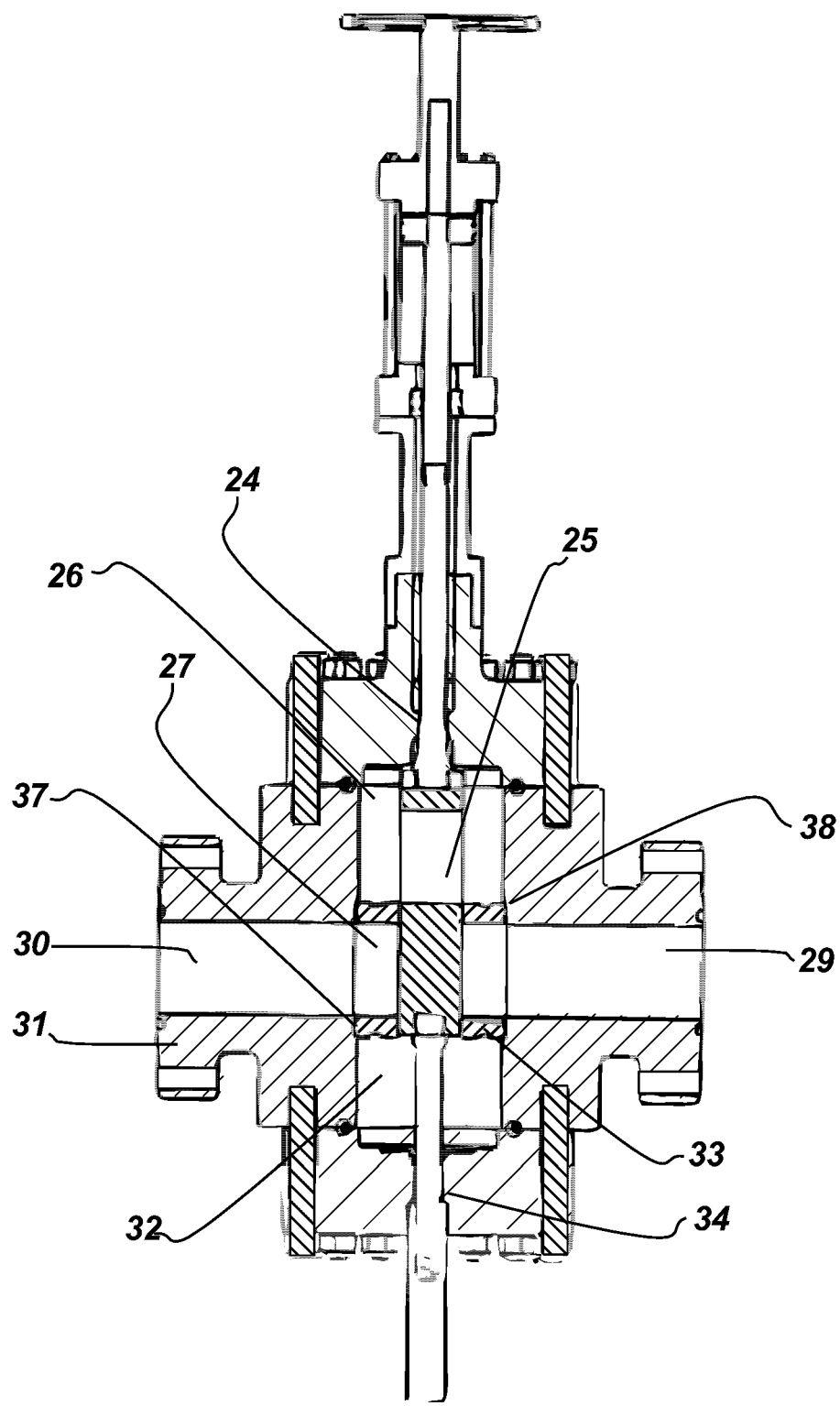
FIG. 7 is a cross-sectional view of a conventional gate valve in the closed position.

As noted previously, another common failure of a conventional gate valve is when the fluid sand mix enters the upper backside void 26 and the lower backside void 32 under very high pressure and velocity and "packs off" within the upper backside void 26 and the lower backside void 32, which stops the gate 25 from moving between the open position as shown in FIG. 6 and closed position as shown in FIG. 7.

As noted previously with reference to FIG. 7 showing the conventional gate valve in the closed position, when the fluid sand mix enters the valve body 31 through the upstream passage 30, the gate 25 is pushed up against the downstream seat 33 and downstream seat pocket 38. A seal is formed between gate 25, downstream seat 33, and downstream seat pocket 38. The fluid sand mix now cannot communicate with the downstream passage 29. However, a gap is created between upstream seat pocket 37, upstream seat 27, and upstream passage side of gate 25. The fluid sand mix can now enter the upper backside void 26 and the lower backside void 32, which will cause the conventional gate valve to fail as it would in the open position.

When the fluid sand mix enters the valve body 31 through the downstream passage 29, the gate 25 is pushed up against the upstream seat 27 and upstream seat pocket 37. A seal is formed between gate 25, upstream seat 27 and upstream seat pocket 37. The fluid sand mix now cannot communicate with the upstream passage 30. However, a gap is created between downstream seat pocket 38, downstream seat 33, and downstream passage 29 side of gate 25. The fluid sand mix can now enter the upper backside void 26 and the lower backside void 32, which will cause the conventional gate valve to fail as it would in the open position.

Shown in FIGS. 3 and 4, if the hydraulic pressure source 23 fails to deliver pressure or it is desired to use the currently disclosed embodiment as a conventional valve with no hydraulic pressure, the gate valve assembly is still capable of sealing in the closed position. When pressure enters the gate valve assembly from the upstream passage 2, the gate 5 will be forced against the downstream seat 6, and the downstream seat 6 will be forced against the downstream seat pocket 15. The downstream gate seat sealing surface 13 and downstream seat pocket seat sealing surface 12 will now seal. Fluid sand mix can now not travel from the upstream passage 2 through to the downstream passage 1, and the gate valve assembly is effectively closed.

When pressure enters the gate valve assembly from the downstream passage 1, the gate 5 will be forced against the upstream seat 7 and the upstream seat 7 will be forced against the piston 10. The upstream gate seat sealing surface 4, piston seat sealing surface 11, and valve body seat sealing surface 9 will now seal. OD O-ring 21 and ID O-ring 22 will prevent the fluid sand mix from getting past the piston 10 and into the piston pocket hydraulic recess 14 and the upstream passage 2. Fluid sand mix can now not travel from the downstream passage 1 through to the upstream passage 2, and the gate valve assembly is effectively closed.

The hydraulic valve assembly has a secondary safety feature to ensure that the gate valve assembly will seal and to ensure that the fluid sand mix cannot exit the valve body 3 in both the closed and open position. Shown in FIG. 2, if the OD O-ring 21 fails to seal, the needle valve 20 shown in FIG. 1 can be closed, which will isolate the hydraulic pressure source 23. This action ensures that the fluid sand mix cannot exit the valve body 3 and ensures that the gate valve assembly can continue to be used in a conventional manner similar to a conventional gate valve.

If the ID O-ring 22 and OD O-ring 21 have failed to seal when wellbore pressure was entering the downstream passage 1 while the valve is in the closed position, the gate valve assembly disclosed herein would still act the same way as a conventional gate valve. Needle valve 20 will be in the closed position. The pressure entering the valve body 3 through the downstream passage 2 would force the gate 5 to be pushed towards the upstream seat 7. The upstream seat 7 would be forced up to piston 10. Piston 10 would be forced into piston pocket 16. Valve body seat sealing surface 9, piston seat sealing surface 11, and upstream gate seat sealing surface 4 will now seal.

The piston seat sealing surface is illustrated as a groove 11A in the upstream 7 with a seal 11B to cooperate with the planar crown 10A. In an alternative, the groove 11A can be formed in the piston crown 10A, with the upstream seat 7 being planar.

The use of the piston 10 with the skirt 10B having an outside groove 21A and an inside groove 22A to receive OD O-ring 21 and ID O-ring 22 allows hydraulic pressure to be used to seal the seats 6, 7 and the gate 5 so that the fluid sand mix cannot enter the backside valve cavity 19 to defeat operation when the gate 5 is open or closed. When hydraulic pressure is not applied to the piston 10, the valve operates in the same manner as a conventional valve where fluid sand mix can enter the backside cavity 19 when the valve is closed.

While the disclosure is susceptible to various modifications and alternative forms, specific embodiments thereof are shown by way of example in the drawings and description. It should be understood, however, that the drawings and detailed description thereto are not intended to limit the disclosure to the particular form disclosed, but on the contrary, the intention is to cover all modifications, equivalents and alternatives falling within the spirit and scope of the present disclosure.

The invention claimed is:

1. A gate valve comprising:
a gate movable to allow fluid flow through the gate valve when open and to block fluid flow when closed;
first and second seats disposed on either side of the gate, the first and second seats configured to form and release a gate seal with the gate;
a piston disposed adjacent one of the first or second seats to form a seat seal with the first or second seat, the piston including a crown for contacting the first or second seat and including a skirt projecting from the crown, the skirt including an outside groove on an outside surface, the outside groove having an outside diameter (OD) O ring, the skirt including an inside groove on an inside surface, the inside groove having an inside diameter (ID) O ring;
a piston seat sealing surface on the crown or on one of the first or second seats; and
a valve body, the valve body having a bore therethrough to allow fluid flow when the gate valve is open, the valve body including:
first and second seat pockets recessed from the bore and configured to receive the first and second seats;
a channel between the first and second seat pockets, the channel configured to receive the gate and configured to allow movement of the gate across and away from the bore to open and close the gate valve, the channel forming backside valve cavities behind the gate;
a piston pocket located adjacent one of the first or second seat pockets and away from the channel, the piston pocket recessed from the bore and configured to be sealed to the piston by the OD O ring, the piston pocket including a piston pocket portion for receiving the skirt, the piston pocket portion configured to form a piston seal with the skirt using the ID O ring; and
a hydraulic port having first and second hydraulic port ends, the first hydraulic port end at the piston pocket portion, the piston configured to form the piston seal with the one of the first or second seat when hydraulic pressure is present in the hydraulic port and configured to be sealed from the valve body bore by the OD O ring and the ID O ring, the second hydraulic port end at an exterior of the valve body, each of the first and second seats and the piston including an opening consistent with the bore.

2. The gate valve of claim 1, wherein the piston is a single piece.

3. The gate valve of claim 1, wherein the piston seat sealing surface includes a groove in the one of the first or second seat adjacent the crown.

4. The gate valve of claim 1, wherein the piston seat sealing surface includes a groove in the crown adjacent the one of the first or second seat.

5. The gate valve of claim 1, wherein the skirt has a bottom surface; and wherein the hydraulic port first end is adjacent the bottom surface of the skirt.

6. The gate valve of claim 1, further comprising:
a needle valve connected to the hydraulic port second end.

7. The gate valve of claim 1, wherein the hydraulic port second end is configured to accept hydraulic pressure from an external source.

8. A gate valve sealing element comprising:
a piston including a crown for contacting a first seat and including a skirt projecting from the crown, the skirt including an outside groove on an outside surface for receiving an outside diameter (OD) O ring and including an inside groove on an inside surface for receiving an inside diameter (ID) O ring, the outside groove and the inside groove located to form a piston seal with a piston pocket in a gate valve body when the ID O ring and OD O ring are present, the piston including an opening consistent with a gate valve body bore, the crown configured to form a piston seat sealing surface with the first seat, the skirt configured to receive hydraulic pressure to cause the piston to seal with the first seat, the first seat configured to seal with a gate, and the gate configured to seal with a second seat when the hydraulic pressure is present.

9. The gate valve sealing element of claim 8, wherein the piston is a single piece.

10. The gate valve sealing element of claim 8, wherein the crown is configured to cooperate with a groove in the first seat to form the piston seat sealing surface.

11. The gate valve sealing element of claim 8, wherein the crown includes a groove in the crown adjacent the first seat to form a portion of the piston seat sealing surface.

12. The gate valve sealing element of claim 8, wherein the skirt has a bottom surface; and wherein the hydraulic pressure is to be received at the bottom surface.

13. A method of sealing a gate valve comprising:
providing a gate to open and close a valve body bore in a valve body, the gate adjacent to and between first and second seats, with one of the first and second seats in turn adjacent a piston, the piston including a crown for contacting the one of the first and second seats and including a skirt projecting from the crown, the skirt including an outside groove on an outside surface for receiving an outside diameter (OD) O ring and including an inside groove on an inside surface of the skirt for receiving an inside diameter (ID) O ring, the outside groove and the inside groove located to form a piston seal with a piston pocket in the valve body bore when the ID O ring and OD O ring are present, the piston pocket recessed into the valve body bore, the piston including an opening consistent with the valve body bore, the crown configured to form a piston seat sealing surface with the one of the first and second seats, the skirt configured to receive hydraulic pressure from a hydraulic port in the valve body;

providing the hydraulic pressure via the hydraulic port to the skirt to energize: the piston into sealing contact with the one of the first and second seats, the one of the first and second seats into sealing contact with the gate, and the gate into sealing contact with the other of the first and second seats; and providing a seal between the valve body bore and the hydraulic port when the hydraulic pressure is not provided.

14. The method of claim 13, wherein to energize the piston into sealing contact with the one of the first and second seats, the method comprises providing a groove in the one of the first or second seat adjacent a piston seat sealing surface of the crown.

15. The method of claim 13, wherein to energize the piston into sealing contact with the one of the first and second seats, the method comprises providing a groove in a piston seat sealing surface of the crown adjacent the one of the first or second seat.

16. The method of claim 13, wherein providing the hydraulic pressure to the skirt comprises communicating the hydraulic pressure through the hydraulic port in the valve body to a first port end adjacent the skirt.

17. The method of claim 16, wherein providing the hydraulic pressure to the skirt comprises communicating the hydraulic pressure from a valve connected to a second port end of the hydraulic port on the valve body.

18. The method of claim 13, wherein providing the seal between the valve body bore and the hydraulic port when the hydraulic pressure is not provided comprises maintaining the piston sealed in the piston pocket using the ID O ring and the OD O ring.

19. The gate valve of claim 1, further comprising at least one bonnet attached to the valve body and sealing at least one of the backside valve cavities of the channel.

20. The gate valve of claim 19, further comprising:
a valve stem disposed through the at least one bonnet and connected to the gate inside the valve body; and
a hydraulic ram assembly connected to the valve stem and configured to move the gate.

\* \* \* \* \*